(12) United States Patent
Darroux

(10) Patent No.: US 6,186,178 B1
(45) Date of Patent: Feb. 13, 2001

(54) SPHERE OR ACCUMULATOR WITH MEMBRANE, SUCH AS FOR MOTOR VEHICLE HYDROPNEUMATIC SUSPENSION

(75) Inventor: Jean-Luc Darroux, Montbeton (FR)

(73) Assignees: Automobiles Peugeot, Paris; Automobiles Citroen, Neuilly sur Sein, both of (FR)

(*) Notice: Under 35 U.S.C. 154(b), the term of this patent shall be extended for 0 days.

(21) Appl. No.: 09/297,565
(22) PCT Filed: Nov. 30, 1998
(86) PCT No.: PCT/FR98/02573
§ 371 Date: Jul. 13, 1999
§ 102(e) Date: Jul. 13, 1999
(87) PCT Pub. No.: WO99/30041
PCT Pub. Date: Jun. 17, 1999

(30) Foreign Application Priority Data
Dec. 5, 1997 (FR) .................................................. 97 15420

(51) Int. Cl.[7] .................................................. F16L 55/04
(52) U.S. Cl. .................. 138/30; 138/26; 220/721
(58) Field of Search .................. 138/30, 31, 26; 220/721

(56) References Cited

U.S. PATENT DOCUMENTS

| | | | | |
|---|---|---|---|---|
| 2,804,929 | * | 9/1957 | Plummer | 138/30 X |
| 3,628,573 | * | 12/1971 | Loliger | 138/30 |
| 4,143,678 | * | 3/1979 | Sugimura et al. | 138/30 |
| 4,181,156 | * | 1/1980 | Zahid | 138/30 |
| 4,428,401 | * | 1/1984 | Chun | 138/30 |
| 4,487,226 | * | 12/1984 | Chun | 138/30 |
| 4,638,838 | * | 1/1987 | Richard et al. | 138/30 |
| 5,072,795 | * | 12/1991 | Delgado et al. | 175/228 |
| 5,987,162 | * | 9/1999 | Arai | 138/30 X |

FOREIGN PATENT DOCUMENTS

| | | | |
|---|---|---|---|
| 052169 | * | 5/1982 | (EP) . |
| 777065 | * | 6/1997 | (EP) . |
| 2588324 | * | 4/1987 | (FR) . |
| 2051955 | * | 1/1981 | (GB) . |

* cited by examiner

Primary Examiner—Patrick Brinson
(74) Attorney, Agent, or Firm—Leydig, Voit & Mayer, Ltd.

(57) ABSTRACT

A pneumatic sphere includes a rigid envelope and a deformable flexible membrane disposed inside the envelope to define an upper chamber containing a gas and a lower chamber containing a liquid. In the upper chamber, a device associated with one of the envelope and the membrane punctures the membrane in response to an excessive pressure in the lower chamber, displacing the membrane to reduce the pressure in the lower chamber.

20 Claims, 3 Drawing Sheets

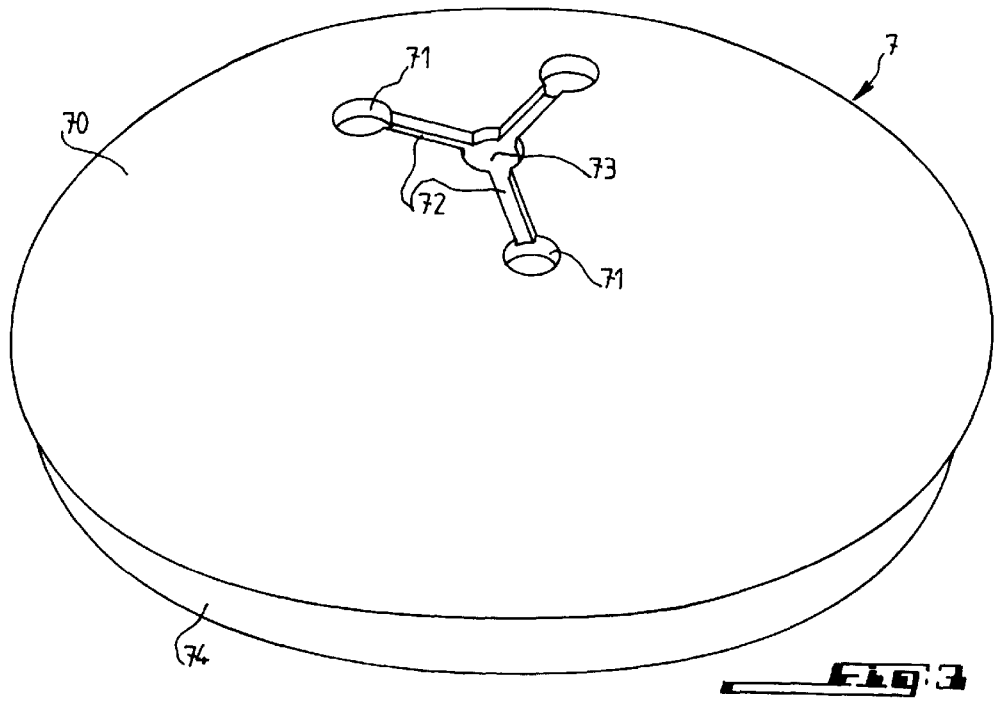
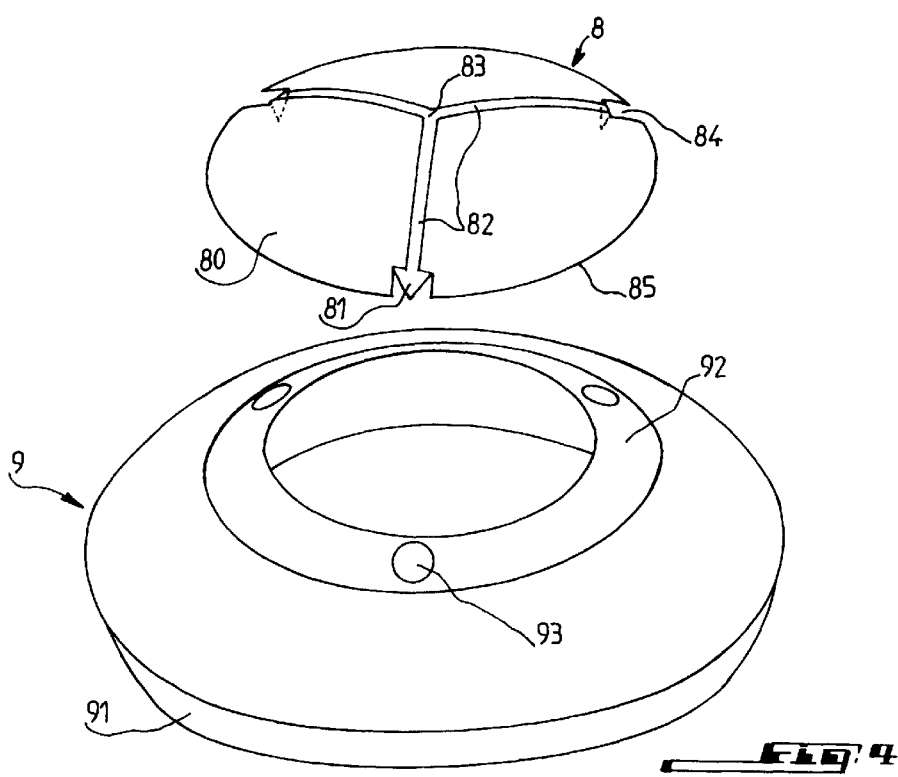

SPHERE OR ACCUMULATOR WITH MEMBRANE, SUCH AS FOR MOTOR VEHICLE HYDROPNEUMATIC SUSPENSION

FIELD OF THE INVENTION

The present invention concerns a pneumatic accumulator or sphere for the hydropneumatic suspension of an automotive vehicle.

BACKGROUND

Conventionally, a pneumatic sphere comprises a rigid exterior envelope, for example metallic, composed of an upper part and a lower part connected together or formed in a single piece, and a deformable flexible membrane fixed at the interior of the envelope at the region of an interface between the upper and lower parts. The membrane thus defines an upper chamber for receiving, for example, a gas, and a lower chamber for receiving, for example, a liquid. In this case, the lower chamber communicates with the hydraulic circuit of the suspension of a vehicle.

Such a sphere is already used for replacing the spring of a MacPherson type suspension.

In the interior of the sphere, the pressure of the liquid is generally between 0 and 250 bar in normal operation.

Fortuitously, the pressure can increase considerably and can reach several times the pressure of use.

It has then been possible to observe the explosion of the sphere and violent ejection of the interior components from the sphere.

An explosion constitutes a great danger to the user of the vehicle.

SUMMARY OF THE INVENTION

The invention thus has the objective of preventing the aforementioned disadvantages and of proposing a pneumatic sphere for hydropneumatic suspension of an automotive vehicle, for example, permitting the prevention of the ejection of pieces of debris upon rupture of the sphere when subjected to exceptional pressure, this sphere contributing thus to the safety of the user of the vehicle.

The invention concerns therefore a pneumatic sphere, comprising a rigid envelope and a deformable flexible membrane disposed at the interior of this envelope defining an upper chamber containing, for example, a gas under pressure, and a lower chamber used for receiving, for example, a liquid. The upper chamber includes means associated with the envelope or with the membrane in order to puncture the membrane in case of overpressure in the lower chamber and thereby to reduce the pressure in this chamber.

In a first embodiment, this means is a cap associated with the upper part of the envelope and comprising at least one hole.

In a second embodiment, this means is a cap associated with the upper part of the envelope and comprising, on a concave surface, at least one claw or the like that projects towards the interior of the envelope.

Preferably, the cap comprises, on its convex surface, at least one groove that terminates at a hole in the cap.

According to a preferred embodiment, the cap comprises three radial grooves, each of them terminating at a hole in the cap.

In an embodiment variant, the cap is tightly connected by its edge to a rigid annular insert fixing the peripheral edge of the membrane onto the envelope and reducing the ullage in the upper chamber.

In another embodiment variant, the cap is approximately hemispherical and forms a rigid annular insert serving to fix the peripheral edge of the membrane onto the envelope and reducing the ullage in the upper chamber.

Finally, when the upper chamber contains a gas under pressure, it is preferably closed by an irremovable element, particularly welded over the envelope.

BRIEF DESCRIPTION OF THE DRAWINGS

The invention will be better understood and other objectives, advantages and characteristics thereof will appear more clearly with the reading of the following description, relative to the non-limiting embodiments of the invention and in which:

FIG. 3 is a perspective view of the cap according to a second embodiment of the sphere of the invention.

FIG. 4 is a perspective view of a cap and an insert according to a third embodiment of the sphere of the invention.

The elements common to the different figures will be designated by the same references.

DESCRIPTION OF THE PREFERRED EMBODIMENTS

Figure 1:
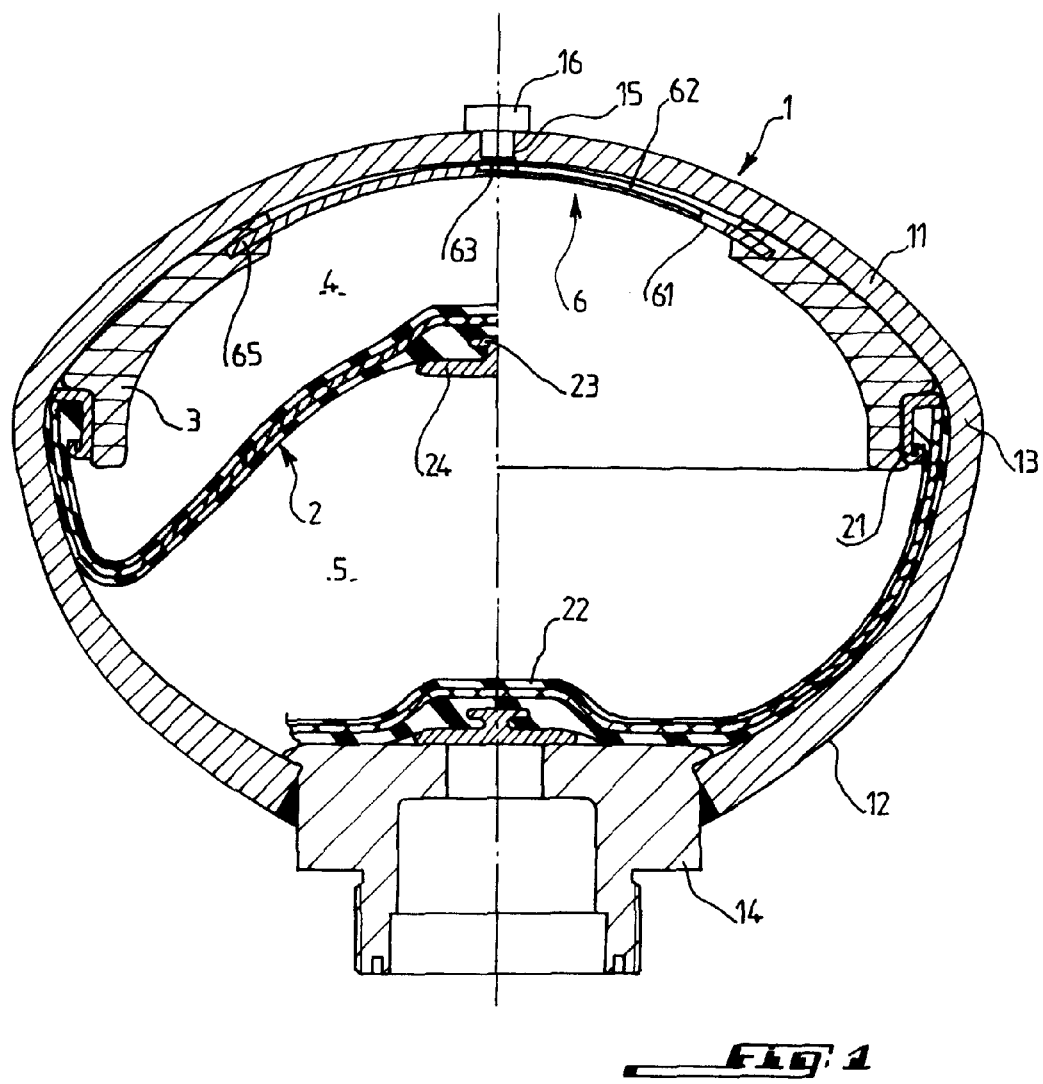
FIG. 1 represents, in section, a first embodiment of the sphere according to the invention, with the membrane in resting position in the left half-view and with the membrane in extreme low position in the right half-view.

In reference to FIG. 1, the sphere according to the invention has an external envelope 1, for example metallic, having in general, a somewhat flattened form.

The envelope 1 comprises an upper part 11 and a lower part 12 which are separated by an interface region 13.

The lower part 12 has an approximately hemispherical shape, truncated at its base for the attachment of the connection fitting 14.

In the embodiment example illustrated in FIG. 1, the upper part 11 of envelope 1 has a convex form where the curvature is oriented toward the interior of the sphere.

The sphere also comprises a deformable flexible membrane 2 which is fixed at the interior of the envelope 1 at the interface region 13.

In the embodiment illustrated in FIG. 1, the membrane 2 is fixed at the interior of the envelope by means of the insert 3. Thus, the rigid annular insert 3 is shaped in such a way to retain the peripheral edge 21 of the membrane 2 against the interior surface of the envelope 1. It is also used for the purpose of filling the ullage situated particularly above peripheral edge 21.

The membrane 2 thus defines the upper chamber 4 containing for example, a gas, and the lower chamber 5 for receiving, for example, a liquid.

When the sphere is intended for being used in hydropneumatic suspension of an automotive vehicle, the upper chamber 4 contains a gas under pressure which is injected through an opening 15 situated at the summit of the envelope 1.

In the example represented in FIG. 1, the membrane 2 is multilayered. It is impermeable, and it is therefore not necessary to re-inject gas, after the manufacture of the sphere. This is the reason the opening 15 is closed by irremovable element 16 which can be welded.

The lower chamber 5 of the sphere communicates, by the intermediary of a connection fitting, with the hydraulic circuit of the suspension of the vehicle (not represented).

The sphere according to the invention also comprises a cap 6 which is placed against the upper part 11 of the envelope 1, at the level of its summit.

This cap 6 is retained in the position illustrated in FIG. 1 by means of the insert 3. In the example illustrated in FIG. 1, the edge 65 of the cap 6 is fixed to the interior of a recess in the upper edge of the insert 3.

The cap 6 comprises, on its convex surface 60, a hole 61 and a groove 62 which extends from the summit 63 of the cap facing the opening 15 to the hole 61.

Figure 2:
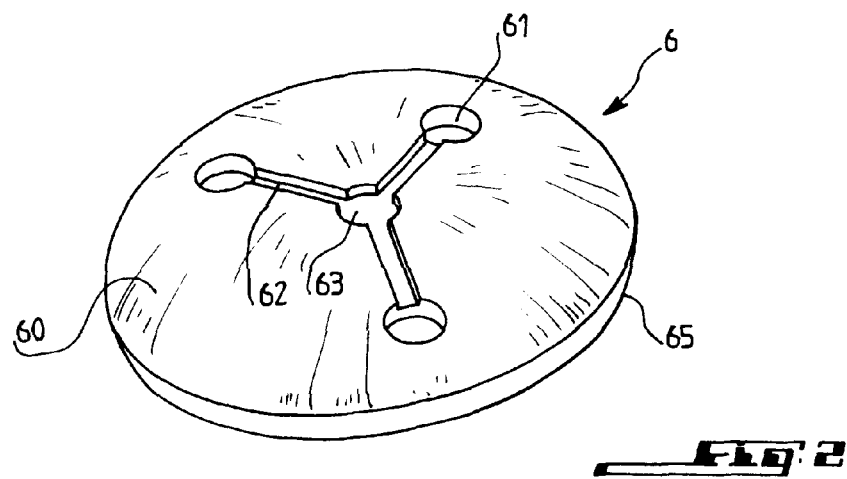
FIG. 2 is a perspective view of the cap represented in FIG. 1.

As illustrated more precisely in FIG. 2, the cap 6 preferably includes three holes 61 and three radial grooves 62, each extending from the summit 63 of cap 6 to one of the holes 61.

These grooves 62 are for the purpose of facilitating the passage of the gas to the interior of the upper chamber 4, when it is injected through the opening 15.

Figure 5:
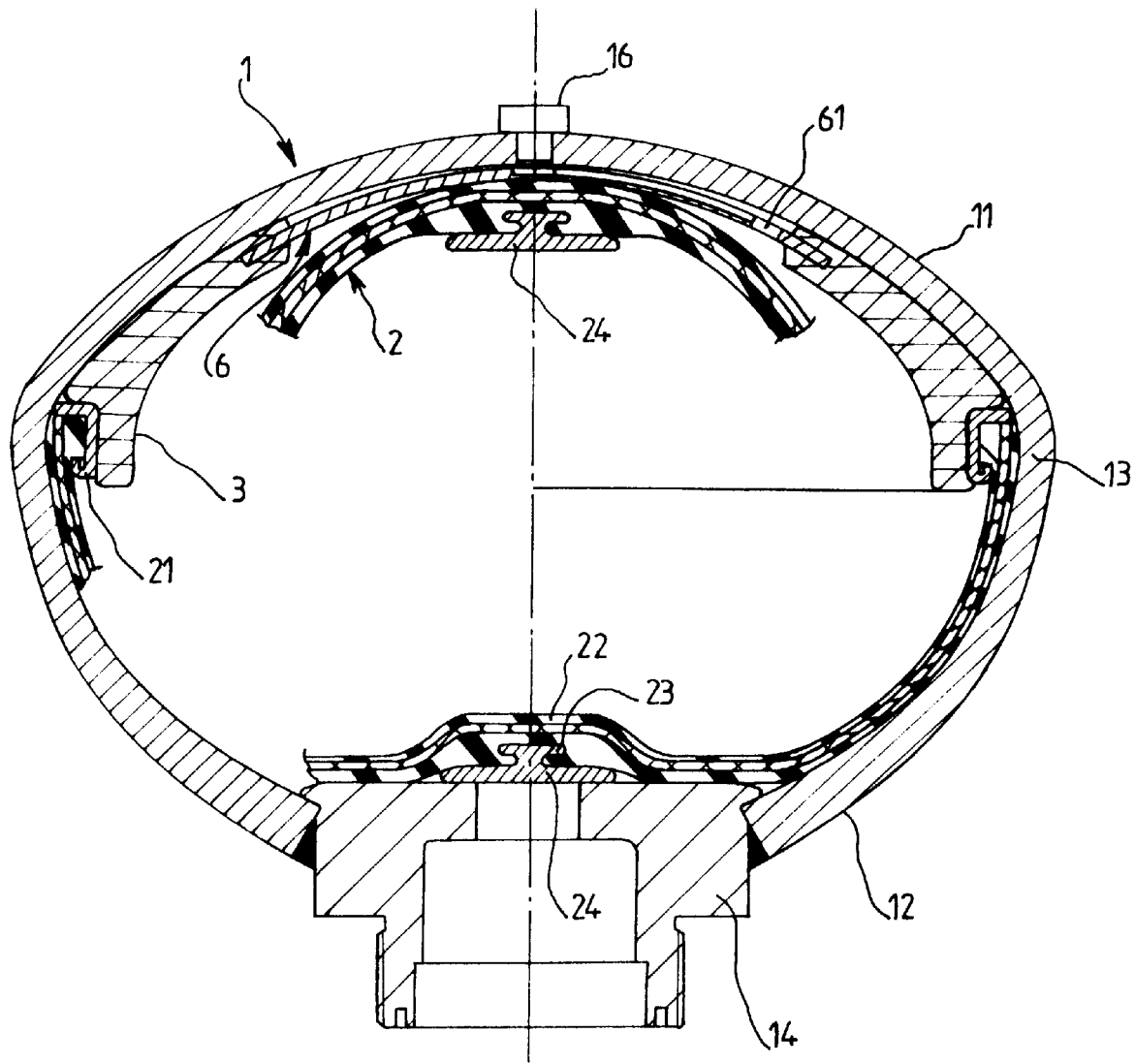
FIG. 5 is a view in section of the sphere according to the invention, with the membrane in an extremely high position, partially represented.

Under the effect of the pressure of the liquid which passes through the connection fitting 14, the membrane 2 is displaceable toward the interior of the envelope 1 between an extreme low position, represented in the right half-view of FIG. 1, and an extreme high position, represented in FIG. 5.

In extreme low position, the membrane 2 presents a generally hemispherical form.

FIG. 1 shows that membrane 2 is thicker in its central region 22, in which is embedded an attachment pin 23, tightly with a plate in the form of disk 24 which is attached under this central region 22.

When the membrane is in extreme low position, this plate 24 is in contact with the connection fitting 14. In the extreme high position illustrated in FIG. 5, it is the upper part of the central region 22 of the membrane 2 which is in contact with the center of the cap 6. The membrane is not in contact with the orifices 61 in this position.

In the left half-view of FIG. 1, the membrane 2 is represented in an intermediate position.

In normal conditions of operation, the membrane 2 is therefore displaced between its extreme low position and its extreme high position. The pressure at the interior of the envelope 1 is then between 0 and 250 bar.

Exceptionally, the pressure of the liquid at the interior of the envelope 1 can increase considerably.

In this case, the membrane 2 flattens itself against the cap 6, and one part of the membrane penetrates to the interior of the holes 61.

Under the effect of the pressure which prevails in the lower chamber 5, the membrane 2 is punctured at the level of the orifices 61.

Thus, if the external envelope 1 cracks under the effect of the pressure, the gas escapes from the envelope without the creation of a deterioration, and then the liquid flows from the envelope 1.

The puncturing of membrane 2, in case of overpressure at the interior of the envelope 1, permits the progressive liberation of the hydraulic energy by making the pressure in the chamber 5 drop, which eliminates any risk of ejection of pieces of debris and particularly of the plate 24.

Another embodiment of the cap of the sphere according to the invention will now be described in reference to FIG. 3.

The cap 7 presents an approximately hemispherical form. It is intended to be placed against the internal wall of the upper chamber 4 of the sphere according to the invention.

At its upper part, the cap 7 has elements similar to those of the cap 6 illustrated in FIG. 1. It thus includes on its convex surface 70, three radial grooves 72, each of which extends from the summit 73 of the cap to the hole 71.

The lower part of the cap 7 fulfills the same function as the annular insert 3 provided in the embodiment illustrated in FIG. 1. Thus, the cap 7 retains the peripheral edge 21 of the membrane 2 against the internal surface of the envelope 1, thanks to its lower edge 74. Additionally, the cap permits the filling of the ullage situated above the peripheral edge of the membrane.

In case of overpressure, the sphere according to the invention including the cap 7 behaves as explained for the sphere illustrated in FIG. 1.

FIG. 4 illustrates yet another embodiment of the cap and of the insert of the sphere according to the invention.

The cap 8 is intended to be tightly connected with the insert 9, like the cap 6 illustrated in FIG. 1 which is supported by the insert 3.

In this embodiment example, the cap 8 comprises, projecting on its concave surface, at least one claw 81 or the like.

In the example illustrated in FIG. 4, the cap 8 comprises three claws 81.

The cap 8 also comprises, on its convex surface 80, three grooves 82, each of which extends from the summit 83 of the cap to a hole 84.

In the example illustrated in FIG. 4, the claws 81 border the holes 84.

The annular insert 9 comprises a flange 91 intended to maintain the peripheral edge of the membrane against the internal surface of the envelope 1. The insert 9 comprises, on its upper edge 92, the orifices 93, engageable by the claws 81 of the cap 3, which is then tightly connected with the insert 9 by its edge 85. The assembly formed by the cap 8 and the insert 9 presents then an approximately hemispherical form, like the assembly formed by the cap 6 and the insert 3 illustrated in FIG. 1.

The behavior of the sphere according to the invention, including the cap and with the insert illustrated in FIG. 4, is the following.

In normal operation, the deformable membrane 2 can be displaced toward the interior of the envelope 1 between an extreme low position in which it is in contact with the connection fitting 14 and an extreme high position in which the upper part of its central region 22 comes in contact with the center of the cap.

Nonetheless, in this extreme high position, the membrane 2 never comes in contact with the claws 81. One is in the situation illustrated in FIG. 5, for the cap 6 represented in FIG. 1.

Nonetheless, in case of overpressure in lower chamber 5, membrane 2 flattens itself against the cap 8. The membrane is then punctured by the claws 81.

As in the embodiment of the sphere illustrated in FIG. 1, the puncturing of the membrane in case of overpressure at the interior of the sphere avoids the ejection of pieces of debris from the sphere.

In the examples illustrated in the figures, the means permitting the puncturing of the membrane in case of overpressure is associated with the envelope. One could also provide other means for puncturing the membrane, associated with the membrane itself.

In these examples, the upper part 11 of the envelope 1 presents a convex form, and an insert is provided for filling the ullage situated above the peripheral edge of the membrane.

Nevertheless, the invention is not limited to this embodiment. One may provide other forms of the envelope, permitting also the reduction of the ullage and therefore the fatigue of the membrane.

In particular, the upper part of the envelope can form, in section, an S-shaped line, the peripheral edge of the membrane being then retained by a circular collar fixed at the interface between the upper and lower parts of the envelope. One may especially refer in this regard to the French Patent Application No. 2 741 913 the contents of which are included in the present application as a title of reference.

The invention can also apply to conventional spheres which do not comprise particular arrangements for reducing the fatigue of the membrane.

Furthermore, the external envelope 1 can be wholly realized from appropriate materials, for example, from steel or steel. The membrane can have multiple layers, for example, with two layers of rubber sandwiching one layer of polyvinyl alcohol. It can also be a single layer of polyurethane or nitrile.

Finally, one qualified the different parts of the sphere as "upper" or "lower," but the sphere can be disposed in any manner whatever, for example, inclined, horizontal or upside down.

Although the invention has been described in connection with particular embodiments, it comprises all the technical equivalents of the means described.

I claim:

1. A pneumatic sphere for a suspension of an automotive vehicle, the sphere comprising:
   rigid envelope having an interior,
   a deformable flexible membrane disposed inside the envelope, the flexible membrane dividing the interior of the envelope into an upper chamber containing a gas under pressure, and a lower chamber containing a liquid, and
   a device disposed in the upper chamber and associated with one of the envelope and the membrane, puncturing the membrane in response to excessive pressure in the lower chamber to reduce the pressure in the lower chamber.

2. The sphere according to claim 1, wherein the device comprises a cap associated with an upper part of the envelope and comprising at least one hole.

3. The sphere according to claim 1, wherein the device comprises a cap associated with an upper part of the envelope and having a concave surface, the cap including, on the concave surface, at least one claw projecting towards the interior of the envelope.

4. The sphere according to claim 2, wherein the cap includes a convex surface, at least one hole and at least one groove, the groove terminating at the hole.

5. The sphere according to claim 4, wherein the cap comprises three radial grooves and three holes, each of the grooves terminating at a respective one of the three holes.

6. The sphere according to claim 2 comprising a rigid annular insert connected to an edge of the cap, the insert fixing a peripheral edge of the membrane onto the envelope to reduce ullage in the upper chamber.

7. The sphere according to claim 2, wherein the cap is approximately hemispherical and includes a rigid annular insert fixing a peripheral edge of the membrane onto the envelope to reduce ullage in the upper chamber.

8. The sphere according to claim 1, wherein the upper chamber includes an opening closed by a non-removable element.

9. The sphere according to claim 3, wherein the cap includes a convex surface, at least one hole and at least one groove, the groove terminating at the hole.

10. The sphere according to claim 9, wherein the cap comprises three radial grooves and three holes, each of the grooves terminating at a respective one of the three holes.

11. The sphere according to claim 10 comprising a rigid annular insert connected to an edge of the cap, the insert fixing a peripheral edge of the membrane onto the envelope to reduce ullage in the upper chamber.

12. The sphere according to claim 2 comprising a rigid annular insert connected to an edge of the cap, the insert fixing a peripheral edge of the membrane onto the envelope to reduce ullage in the upper chamber.

13. The sphere according to claim 3 comprising a rigid annular insert connected to an edge of the cap, the insert fixing a peripheral edge of the membrane onto the envelope to reduce ullage in the upper chamber.

14. The sphere according to claim 4 comprising a rigid annular insert connected to an edge of the cap, the insert fixing a peripheral edge of the membrane onto the envelope to reduce ullage in the upper chamber.

15. The sphere according to claim 3, wherein the cap is approximately hemispherical and includes a rigid annular insert fixing a peripheral edge of the membrane onto the envelope to reduce ullage in the upper chamber.

16. The sphere according to claim 4, wherein the cap is approximately hemispherical and includes a rigid annular insert fixing a peripheral edge of the membrane onto the envelope to reduce ullage in the upper chamber.

17. The sphere according to claim 5, wherein the cap is approximately hemispherical and includes a rigid annular insert fixing a peripheral edge of the membrane onto the envelope to reduce ullage in the upper chamber.

18. The sphere according to claim 2, wherein the upper chamber includes an opening closed by a non-removable element.

19. The sphere according to claim 3, wherein the upper chamber includes an opening closed by a non-removable element.

20. The sphere according to claim 4, wherein the upper chamber includes an opening closed by a non-removable element.

* * * * *